Patented Oct. 15, 1929

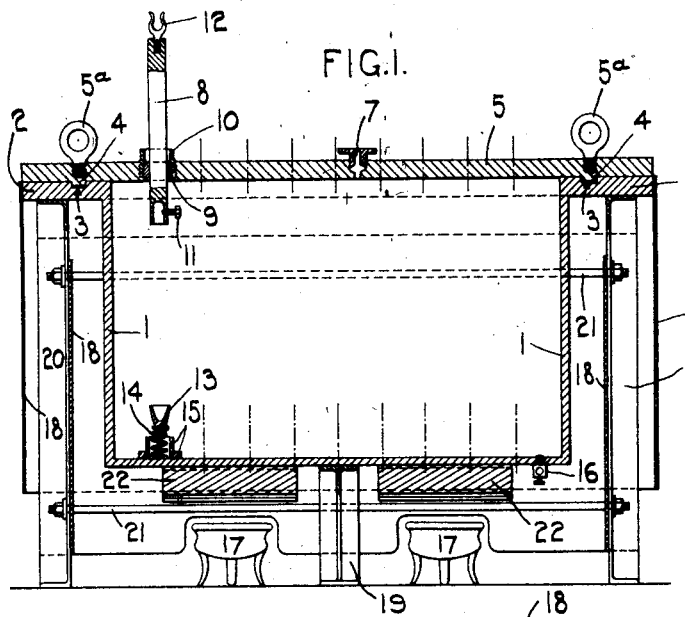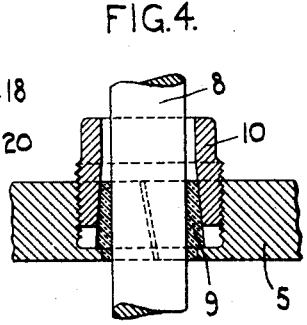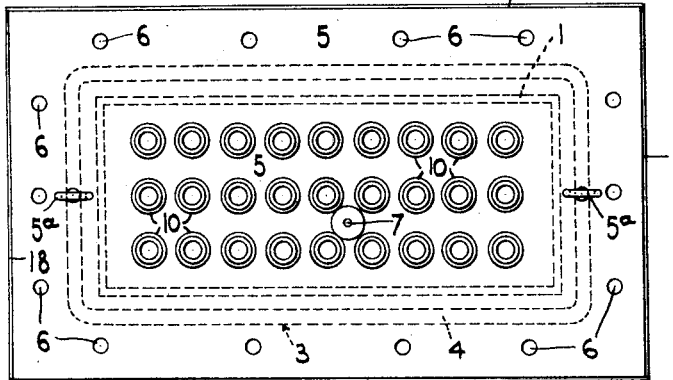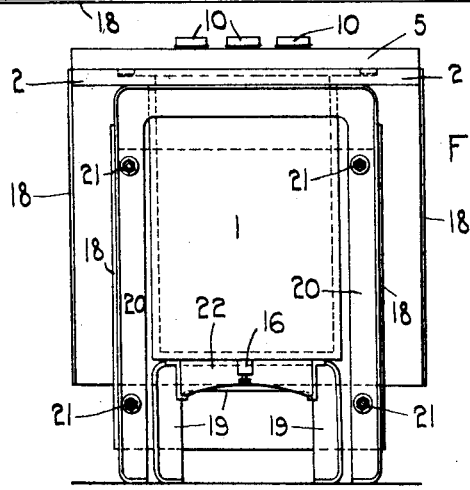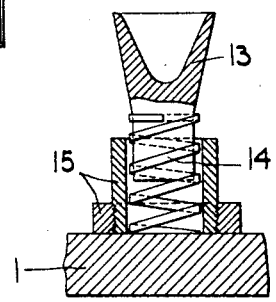

1,731,858

UNITED STATES PATENT OFFICE

CHARLES JAMES GRIST, OF BERKSWELL, ENGLAND, ASSIGNOR OF FOUR-FIFTHS TO CHARLES WILLIAM ST. JOHN ROWLANDSON, OF LONDON, ENGLAND

APPARATUS FOR THE TREATMENT OF TOOLS AND OTHER SMALL STEEL OR STEEL ALLOY ARTICLES

Original application filed January 4, 1928, Serial No. 244,474, and in Great Britain January 7, 1927. Divided and this application filed December 5, 1928. Serial No. 324,038.

This invention relates to apparatus by means of which finished tools and other small steel or steel alloy articles can be heated to any desired temperature and afterwards cooled in a chamber, during which time a current or currents of electricity can be passed through the tools or other goods for the purpose of improving them by removing or modifying the disadvantageous results of stresses set up in the steel or metal of which they are composed during their manufacture, and thereby enabling them to perform the work required of them for a longer period of time and to do given work of equal quality in a shorter period of time. This application is a division of the application filed by me on January 4, 1928, Serial Number 244,474.

The invention relates solely to the apparatus hereinafter described, namely apparatus for the purpose herein specified comprising an externally heated chamber or receptacle, means, insulated from the chamber or receptacle and from each other, for holding a plurality of tools or other articles in said chamber or receptacle, and means for applying an electric current to the tools or other articles supported in said chamber or receptacle. The said apparatus may be employed for utilizing the motive powers of heat and electricity beneficially upon finished steel tools and other goods. The temperature to which any given tool or tools shall be raised, the medium surrounding it or them in the chamber in which they are being treated (whether gaseous liquid or solid), the strength of the electric current and the duration of time it is applied, must necessarily be varied according to the chemical contents of the steel or iron of which the articles are composed, their history, and the work they have to perform, and are determined by experiments.

Fig. 1 of the accompanying illustrative drawings shows in central longitudinal vertical section a construction of apparatus embodying the invention.

Fig. 2 shows the apparatus in plan.

Fig. 3 is an end elevation of the apparatus with the end baffle plates removed.

Figs. 4 and 5 are vertical sectional elevations to a larger scale showing parts of the apparatus to which reference will be hereinafter made.

In the drawings, which illustrative, by way of example only, one construction of the apparatus, 1 indicates a chamber or receptacle made preferably of wrought steel which may be of any convenient shape but which is of rectangular shape in the construction shown. At its upper edge the receptacle or chamber 1 has an outwardly extending flange 2 which is formed with a marginal recess 3 adapted to be engaged by a marginal spigot 4 projecting downwardly from a cover plate 5 which is adapted to be secured to the flange 2 by means of bolts passed through holes 6 formed therefor in the cover 5 and flange 2. In order to provide a tight joint between the cover 5 and receptacle 1, the marginal spigot 4 of the cover 5 bears on asbestos or other suitable material packed into the marginal recess 3 of the flange 2.

Eye bolts 5ª are screwed into the cover 5 to facilitate its removal. 7 indicates a hole in the cover 5 furnished with a gland through which a thermic couple can be passed into the receptacle, the cold junction of said couple being connected at the exterior of the apparatus to a galvanometer for the purpose of recording the temperature inside the receptacle. Any number of thermic couples may be inserted in the chamber according to its size and requirements. 8 indicates a tool holding spindle that is passed through an insulating bush 9 provided therefor in the cover 5. The bushes 9 insulate the tool holders from the chamber or receptacle and from each other. Each insulating bush, see Fig. 4, consists of a split ring 9 of asbestos or other suitable material having a conical exterior on which bears the conical bore of a lock nut 10 that is screwed into the hole formed therefor in the cover. By screwing down the said nut on to the split ring 9 the spindle 8 is firmly held in the required position so that the extent to which its lower end enters the receptacle or chamber can be determined as desired according to the length of the article being treated. At its lower end the tool holding spindle 8 is fitted with a screw 11 or other suitable means for holding the tool or article to be treated, and at its upper end a clip 12 or other device is fitted on the spindle 8 whereby it may be connected readily to an electric conductor connected to the positive pole of a switch board, not shown. In axial alignment with the tool holding spindle 8 there is fixed on the bottom of the receptacle 1 a contact device for the lower end of the article carried by the spindle 8. This device, see Fig. 5, consists of a self-centering cup 13 mounted in the upper end of a helical spring 14 which is carried in a holder 15 secured to the bottom of the receptacle. Any suitable means in electrical contact with the receptacle or chamber, such for example as a binding screw 16, is secured to the receptacle or chamber 1 to receive a conductor connected to the negative pole of the before-mentioned switch board.

In the example of apparatus under notice the receptacle or chamber is heated by Bunsen flame burners 17 and the heat is conserved and radiation minimized by means of baffle or muffle plates 18 made say of iron lined with asbestos, or other suitable material, and extending entirely around the sides and ends of the receptacle or chamber. The said baffle or muffle plates may in some cases be made of firebrick or other refractory material.

The receptacle or chamber is supported on a centrally arranged support 19 and on end supports 20, and the said end supports, which carry the inner baffle plates 18, may, as shown, be connected by the bolts 21.

In order to protect the bottom of the receptacle from the direct impingement of the Bunsen burner flames, blocks 22 of firebrick or other appropriate material can, if so desired, be fixed to the bottom of the receptacle, as shown, over the Bunsen burners.

As before stated the receptacle or heating chamber can be of any desired size and shape and can be arranged to receive any desired number of tools or articles to be treated.

The apparatus illustrated is particularly suitable for treating articles such as steel tools and is designed to treat say twenty-seven of such articles at one time, there being that number of tool holding spindles fitted in the cover and that number of self-centering cups fixed to the bottom of the receptacle. As will be understood variations in details of design and construction can be made without departure from the invention.

The electrical switch board hereinbefore-mentioned but not shown in the drawings, is of any appropriate type and is provided with contacts connected to the several holders 12, the said contacts being connected to a source of current as by switch levers, either individually or in groups so that an electric current can be applied to each tool separately or to any desired number or to all of the tools simultaneously, at and for any given period of time.

What I claim is:—

1. Apparatus for use in the treatment of finished tools of steel or steel alloys, comprising an externally heated receptacle, a cover for said receptacle, means for making a tight joint between said receptacle and said cover, tool holders insulated from and extending through said cover into said receptacle, devices within said receptacle that make electrical contact with tools carried by said tool holders, means for heating said receptacle, and means for placing said tool holders and said contact devices in connection with a source of electric current so that an electric circuit is completed through the tools carried by said tool holders within said receptacle.

2. Apparatus for use in the treatment of finished tools of steel or steel alloys, comprising a receptacle, a cover for same, means for making a tight joint between said receptacle and said cover, bushes of insulating material fitted in said cover, tool holders extending through said bushes into said receptacle, contact devices adapted to receive the ends of tools carried by said tool holders, said contact devices being constituted by self-centering cups fixed to the bottom of said receptacle one in line with each of said insulating bushes, means for heating said receptacle, and means for placing said tool holders and said contact devices in connection with a source of electric current so that an electric circuit is completed through the tools carried by said tool holders within said receptacle.

3. Apparatus as claimed in claim 2 in which the contact devices for the tools carried by the tool holders, each consist of a metal cup carried by a helical spring that is mounted in a suitable holder fixed to the bottom of the receptacle.

4. Apparatus for treating metal articles, comprising a furnace air chamber, holders for the articles projecting vertically through the top of the furnace air chamber and insulated from it, contact pieces at the bottom of the furnace air chamber for the articles to rest on, means for passing an electric current through the articles and holders, and means for heating the furnace air chamber externally.

5. Apparatus for treating metal articles as set forth in claim 4, the holders for the articles being slidable in the top of the furnace air chamber and being provided with means for clamping them when their positions have been adjusted vertically.

In testimony whereof I affix my signature.

CHARLES JAMES GRIST.